(12) United States Patent
Morrill et al.

(10) Patent No.: US 8,099,125 B2
(45) Date of Patent: Jan. 17, 2012

(54) SYSTEM AND METHOD FOR COMMUNICATING WITH AN OPTIMAL WIRELESS COMMUNICATIONS CARRIER

(75) Inventors: Robert J. Morrill, Overland Park, KS (US); Bennett P. Gamel, Overland Park, KS (US)

(73) Assignee: Embarq Holdings Company, LP, Overland Park, KS (US)

( * ) Notice: Subject to any disclaimer, the term of this patent is extended or adjusted under 35 U.S.C. 154(b) by 494 days.

(21) Appl. No.: 11/803,881

(22) Filed: May 15, 2007

(65) Prior Publication Data

US 2008/0286400 A1 Nov. 20, 2008

(51) Int. Cl.
*H04M 1/00* (2006.01)
*H04W 4/00* (2009.01)

(52) U.S. Cl. ............... 455/550.1; 455/432.1; 455/435.1

(58) Field of Classification Search .................. None
See application file for complete search history.

(56) References Cited

U.S. PATENT DOCUMENTS

| | | | |
|---|---|---|---|
| 6,075,988 A * | 6/2000 | Anderson et al. | 455/434 |
| 6,246,875 B1 * | 6/2001 | Seazholtz et al. | 455/432.1 |
| 6,272,343 B1 * | 8/2001 | Pon et al. | 455/434 |
| 6,415,148 B1 * | 7/2002 | Chiniga et al. | 455/434 |
| 2004/0203745 A1 * | 10/2004 | Cooper | 455/432.1 |
| 2004/0246922 A1 * | 12/2004 | Ruan et al. | 370/331 |
| 2005/0085228 A1 * | 4/2005 | Welnick et al. | 455/432.1 |
| 2005/0113089 A1 * | 5/2005 | Bamburak et al. | 455/435.2 |
| 2008/0198811 A1 * | 8/2008 | Deshpande et al. | 370/332 |

\* cited by examiner

*Primary Examiner* — Erika Gary
(74) *Attorney, Agent, or Firm* — Patton Boggs LLP (57) ABSTRACT

Improvement of wireless communications of a wireless device may include storing a preferred roaming list containing information associated with communications carriers arranged in a predetermined order. It may be determined that a signal strength of a first communications signal of a first communications carrier currently being received by a wireless device drops below a signal strength threshold value. A second communications carrier in the preferred roaming list having a second communications signal with a higher signal strength than the signal strength of the first communications signal may be selected. A time interval over which to receive the second communications signal from the second communications carrier may be initiated and a switch may occur from receiving the second communications signal from the second communications carrier to receiving a third communications signal from a communications carrier in the preferred roaming list in response to completion of the time interval.

21 Claims, 6 Drawing Sheets

SYSTEM AND METHOD FOR COMMUNICATING WITH AN OPTIMAL WIRELESS COMMUNICATIONS CARRIER

BACKGROUND OF THE INVENTION

Wireless communications has become pervasive throughout the world. Even though wireless communications carriers have placed communications access points extensively in metropolitan areas, there are many metropolitan areas that have poor wireless communications coverage provided by one or more wireless carriers. In other words, there are areas within or near cities that have "dead-zones" or are sparsely covered by one or more wireless carriers. Typically, the quality of wireless communications services is dictated by a number of factors, include density of communications antennas, power provided to the communications antennas, and natural and man-made obstacles, for example. Furthermore, rural areas in many countries of the world, including the United States, are not well equipped with wireless communications services. In the case of a wireless communications carrier not providing coverage in an area, the wireless communications carrier may have a roaming agreement with other wireless communications carriers so that its customers may roam onto the networks of the other wireless communications carriers.

In areas of lower coverage of wireless communications services, wireless devices, such as mobile telephones, personal digital assistants, games, or other wireless devices, can receive poor wireless communications services, which includes dropping communications links (e.g., dropping telephone calls) or having communications services that drops data due to communicating with a weak or marginal communications signal. A marginal communications signal typically occurs when a communications signal being received by the wireless device has a signal strength nearing the threshold sensitivity of the receiver (e.g., below −102 dBm). The specific value of a marginal communications signal may vary based on a variety of factors, including communications carrier definitions, wireless device performance, area in which wireless communications are being provided, and system specifications.

As previously described, wireless communications carriers form roaming agreements with one another to enable subscribers of the respective wireless communications carriers to roam between networks of the other wireless communications carriers. Each of the wireless communications carriers has a preferred list of communications carriers based on a number of factors, including revenue sharing arrangements and other contractual benefits for the respective wireless communications carriers. The wireless carriers typically store a preferred roaming list in wireless devices to enable the wireless devices to seek, in order of preference, the networks of wireless carriers identified on the preferred wireless carriers when roaming (i.e., when a wireless device is out of range of the communications carrier of the subscriber and connected to a network of another communications carrier). Roaming lists typically store system identifiers (SIDs) associated with respective communications carriers.

While a wireless device communicates with a wireless communications system, signal strength of a communications signal above a marginal communications signal generally provides a user with an acceptable communications signal to communicate with the wireless communications system. However, conventional wireless communications devices are configured to communicate with a communications signal until the communications link is ultimately dropped. This means that the wireless device may communicate with the wireless network using a marginal communications signal until the communications link is dropped. If a user of the wireless device places a call, for example, while the wireless device is in communication with a wireless access point while operating with a marginal communications signal, the call can be poor, which may cause static, information loss, or a drop during the call. In response to a communications link being dropped, the wireless device attempts to establish another communications link with a wireless access point of one of the communications carriers on the preferred roaming list.

SUMMARY

To overcome the problem of conventional wireless devices communicating with a marginal communications signal until a communications link is dropped, the principles of the present invention provide for a marginal communications signal to be detected or a user may manually initiate a quality of service signal and, in response, a search may be performed for a communications signal having a higher signal strength of a communications carrier on a preferred roaming list. In detecting a communications link having a higher signal strength, the wireless device may form a communications link with the communications carrier for a period of time. After the period of time, another search may be performed to locate a more preferred communications carrier having a communications signal with a higher signal strength.

One embodiment of a wireless device in accordance with the principles of the present invention includes a transceiver configured to transmit and receive communications signals. A processor may be in communication with the transceiver and a memory may be in communication with the processor and configured to store a preferred roaming list containing information associated with communications carriers arranged in a predetermined order and a signal strength threshold value. Software modules may be executed by the processor, and include a timer module configured to define a time interval that specifies how often a signal search module executes, a signal strength measurement module configured to measure signal strength of a communications signal received by said transceiver. The signal search module may be configured to (i) determine that the signal strength of a first communications signal of a first communications carrier currently being received by said transceiver drops below the signal strength threshold value, (ii) select a second communications carrier in the preferred roaming list positioned in a first direction from the position in the preferred roaming list of the first communications carrier having a second communications signal with a higher signal strength than the signal strength of the first communications signal, (iii) cause the transceiver to receive the second communications signal from the second communications carrier, (iv) cause the timer module to initiate a time interval between which the transceiver receives the second communications signal from the second communications carrier, and (v) switch the transceiver from receiving the second communications signal from the second communications carrier to receiving a third communications signal from a communications carrier positioned opposite the first direction on the preferred roaming list in response to completion of the time interval.

One embodiment of a method for improving wireless communications for a user of a wireless device includes storing a preferred roaming list containing information associated with communications carriers arranged in a predetermined order. A signal strength threshold value may be stored. It may be determined that a signal strength of a first communications signal of a first communications carrier currently being received by a wireless device drops below the signal strength threshold value. A second communications carrier in the preferred roaming list positioned in a first direction from the position in the preferred roaming list of the first communications carrier having a second communications signal with a higher signal strength than the signal strength of the first communications signal may be selected. The second communications signal from the second communications carrier may be received. A time interval over which to receive the second communications signal from the second communications carrier may be initiated and a switch may occur from receiving the second communications signal from the second communications carrier to receiving a third communications signal from a communications carrier positioned opposite the first direction on the preferred roaming list in response to completion of the time interval.

BRIEF DESCRIPTION OF THE DRAWINGS

Illustrative embodiments of the present invention are described in detail below with reference to the attached drawing figures, which are incorporated by reference herein and wherein.

DETAILED DESCRIPTION OF THE DRAWINGS

Figure 1:
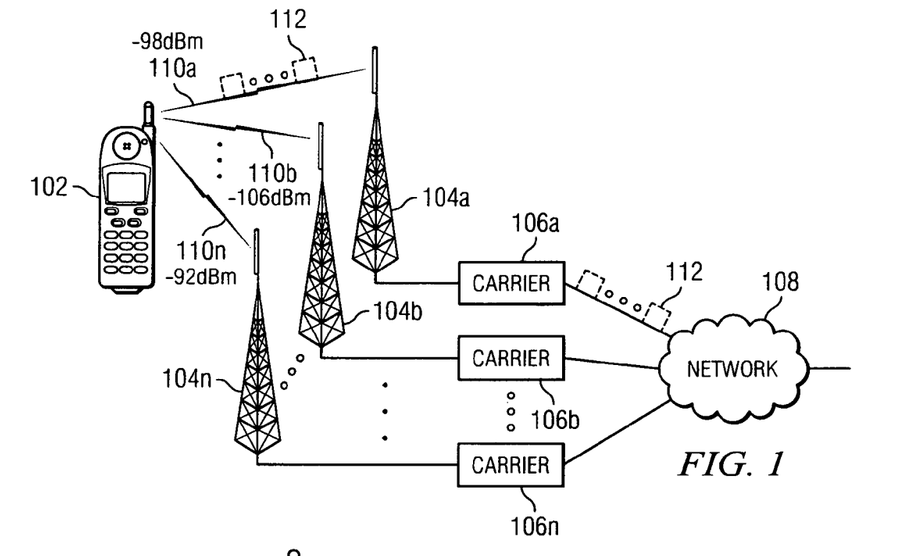
FIG. 1 is an illustration of an exemplary communications system showing a wireless device in range of wireless access points of wireless networks of multiple wireless communications carriers.

FIG. 1 is an illustration of an exemplary communications system 100 showing a wireless device 102 in range of wireless access points 104a-104n (collectively 104) of wireless networks of multiple wireless communications carriers 106a-106n (collectively 106). Each of the wireless carriers 106 operates communications systems to communicate wireless communications signals over a network 108. In one embodiment, the network 108 may include a telecommunications network Alternatively, the network 108 may include the Internet. As shown, the wireless access points 104 may be communicating wireless communications signals 110a-110n (collectively 110) that are within range of the wireless device 102. The wireless communications signals 110 may each have signal strength when measured by the wireless device 102. For example, communications signal 110a has signal strength of −98 dBm, communications signal 110b has signal strength of −106 dBm, and communications signal 110n has signal strength of −92 dBm. In one embodiment, the wireless device is a subscriber of communications carrier 106a, so it may be configured to first communicate with the wireless network of communications carrier 106a and then communicate with communications carriers included in a preferred roaming list stored in the wireless device 102, as further described in FIGS. 2A, 2B, and 3. In communicating with the wireless access point 104a, the wireless device 102 may communicate packets 112 that are communicated over the network 108.

Figure 2A:
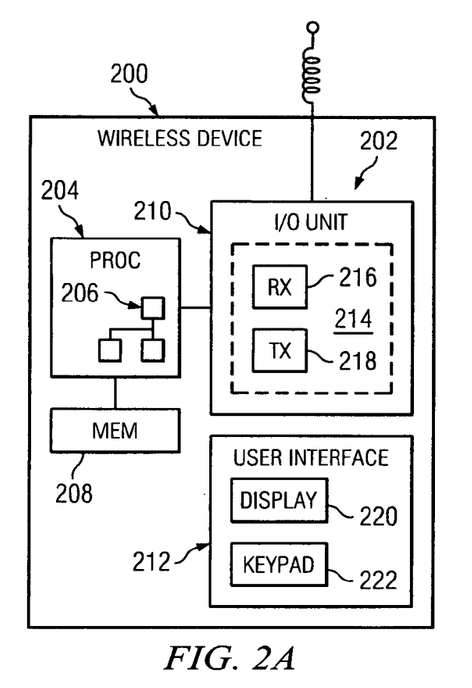
FIG. 2A is a block diagram of an exemplary wireless device and internal components thereof.

FIG. 2A is a block diagram of an exemplary wireless device 200 and internal components 202 thereof. The internal components 202 may include a processor 204 that executes software 206. The processor 204 may be in communication with memory 208, input/output (I/O) unit 210, and user interface 212. The I/O unit 210 may include a transceiver 214 including a receiver 216 and transmitter 218. The user interface may include a display device 220 and keypad 222. The software 206 may be configured to manage operation of the wireless device 200, including performing the basic operations of the wireless device (e.g., place telephone calls, store contact lists, etc.), communicating with a wireless access point of a wireless network of a communications carrier, and operating the user interface 212 to enable a user to operate and interface with the wireless device. The software 206 may further operate to store a preferred roaming list in the memory 206 to enable the wireless device to locate wireless networks of wireless carriers with which the communications carrier of a subscriber user has agreements to enable its subscribers to roam.

Figure 2B:
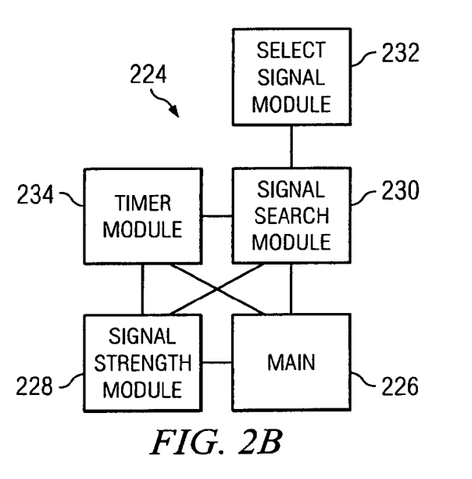
FIG. 2B is a block diagram of exemplary software modules executed by the wireless device of FIG. 2A to enable the wireless device to improve wireless communications for a user.

FIG. 2B is a block diagram of exemplary software modules 224 executed by the wireless device 200 of FIG. 2A to enable the wireless device to improve wireless communications for a user. The modules may include a main module 226 that is used to manage top-level operations of the wireless device 200. As the wireless device 200 is operating, the main module 226 may communicate with the signal strength module 228 that is configured to measure signal strength of wireless communications signals received by the wireless device 200. In one embodiment, the signal strength module 228 may sequentially measure a communications signal from one or more wireless carriers on or off a preferred roaming list stored by the wireless device 200. A signal search module 230 may be called by the main module 226 to determine if a communications signal over which the wireless device 200 is communicating is below a threshold level indicative of being a marginal communications signal. If so, then the signal search module 230 may call a select signal module 232 that, in one embodiment, may determine a wireless communications signal in range of the wireless device of each wireless communications carrier listed on the preferred roaming list having the highest signal strength. Alternatively, the select signal module 232 may sequentially, from top to bottom, determine whether a communications carrier listed on the preferred roaming list has a communications signal with a higher signal strength than the current communications signal and select to communicate using that communications signal. It should be understood that a number of different selection techniques may be used to select a communications signal having a higher signal strength for the wireless device 200 to communicate with a network.

Although the wireless device 200 is able to communicate using a communications signal having a higher signal strength, the communications carrier providing the communications signal is not the most preferred communications carrier (i.e., the communications carrier of the subscriber) or may not be a communications carrier with which the most preferred communications carrier has a strong relationship with so that access fees are at a minimum, so the signal search module may call a timer module 234 to set a time interval over which the wireless device 200 roams and, in response to completing the time interval, determines whether the wireless device 200 can revert back to the communications carrier with which the user subscribes or a communications carrier listed higher on the preferred roaming list. It should be understood that the modules 224 are exemplary. There may be different and/or additional modules used to perform the functionality in accordance with the principles of the present invention and that the modules may be combined or further separated to perform one or more functions. Additionally, the modules 224 may be preloaded in the wireless device or may be downloaded, either by the user or the communications carrier with which the user subscribes.

Figure 3:
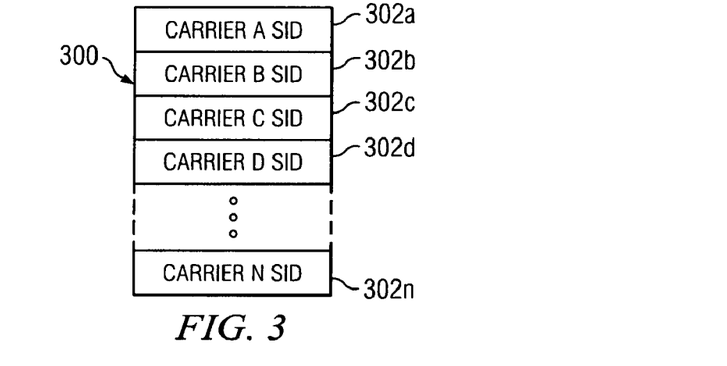
FIG. 3 is an illustration of an exemplary preferred roaming list.

FIG. 3 is an illustration of an exemplary preferred roaming list 300. The preferred roaming list 300 may be stored in a memory as a sequential series of memory cells 302a-302n (collectively 302) that store information associated with wireless carriers having roaming agreements with the communications carrier that supply or services the wireless device. For example, the information stored in the memory cells may include system identifiers (SIDs). The order of the information stored in the preferred roaming list 300 may be used by software in the wireless device to attempt to communicate in sequential order from top to bottom (e.g., most preferred to least preferred). However, the search may be performed in any order, but, generally, the search may be performed in a manner that most financially benefits (i.e., that charges the communications carrier the least for its subscribers that roam onto the roaming carrier's wireless network the communications carrier that the user subscribes. Other ordering may be established as desired.

Figure 4A:
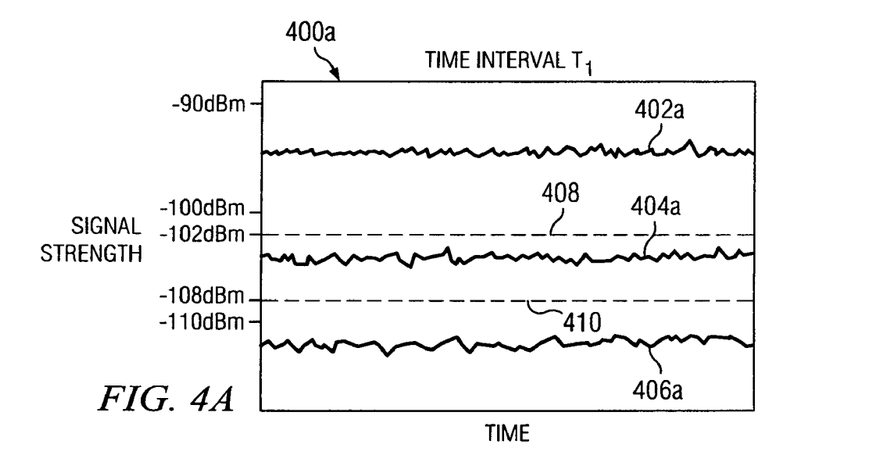
FIGS. 4A and 4B are exemplary graphs showing multiple communications signals of wireless communications carriers within range of a wireless device.
Figure 4B:
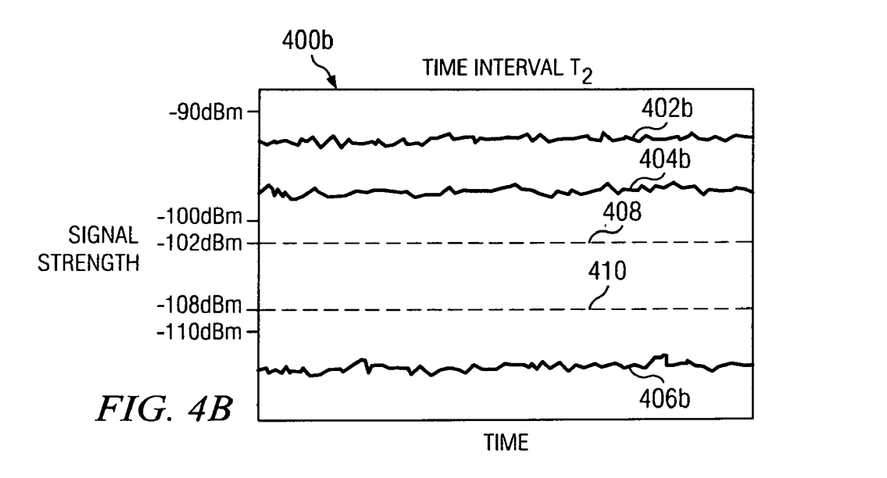

FIGS. 4A and 4B are exemplary graphs 400a and 400b showing multiple communications signals of wireless communications cameras within range of a wireless device. As shown in graph 400a, there are three communications signals 402a, 404a, and 406a that are within range of the wireless device. Communications signal 402a is measured to be about −95 dBm, communications signal 404a is measured to be about −104 dBm, and communications signal 406a is measured to be about −113 dBm A dashed line 408 is indicative of a threshold signal strength value of −102 dBm, which was pre-established as an upper marginal communications signal. Another dashed line 410 is indicative of signal strength about where the wireless device loses connection with the communications signal. Communications signals having signal strength at or between the dashed lines 408 and 410 are considered to be marginal communications signals. It should be understood that the specific values of the dashed lines are exemplary and may be different based on a number of factors, include the components of the wireless device. For example, a wireless device with particularly sensitive transceivers may be set at lower levels, while others having less sensitive transceivers may be set at higher levels.

As shown, graph 400a shows three communication signals 402a, 404a, and 406a over time interval $T_1$. It should be noted that signals 406a and 406b may be valid signals in this physical area, but may be considered to be noise by the receiver due to the sensitivity of the receiver. If, for example, the wireless device is communicating using the communication signal 404a, a determination may be made that the signal is a marginal communications signal due to being below the threshold signal strength level 408. In response to determining that the signal is a marginal communications signal, a search for another communications signal, such as communications signal 402a, of a communications carrier in the preferred roaming list may be performed. The search may be initiated automatically by the wireless device or manually by a user of the wireless device pressing a button on the wireless device (e.g., quality of service ("QOS") button). In one embodiment, a notification to the user of the wireless device may be generated by the wireless device in response to determining that the communications signal is a marginal communications signal. For example, the notification may be an audible (e.g., tone) and/or visual (e.g., light) notification. The wireless device may communicate using the communications signal 402a for active communications (e.g., to place a telephone call or communicate data) or until a later time, possibly established by a timer, when the wireless device may attempt to re-establish communications with the communications signal 404b (FIG. 4B). As shown in FIG. 4B, signal strength of wireless communications signal 404b, which is from the same wireless access point as communications signal 404a, has increased above the marginal communications signal threshold level 408 over time interval $T_2$. The wireless device may switch to use the communications signal 404b since it is from a communications carrier more highly ranked on the preferred roaming list. The communications signal may be sampled periodically and averaged to determine the current level of the communications signal. Other measuring techniques may be utilized as understood in the art. It should be noted that by reestablishing communications with the communications signal 404b, which is provided by a communications carrier of the subscriber who owns the wireless device, roaming charges may be minimized for the subscriber and communications carrier.

Figure 5:
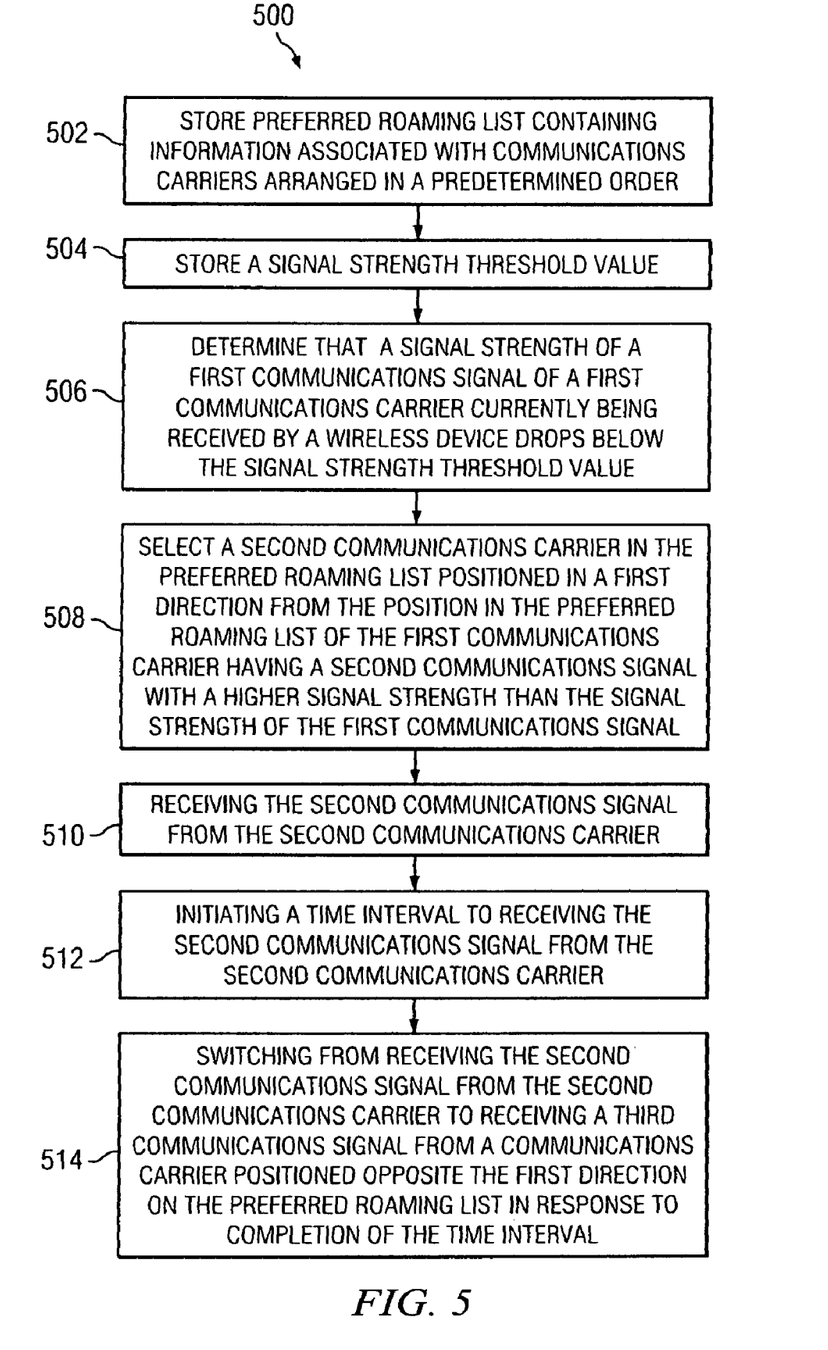
FIG. 5 is a flow diagram of an exemplary process for improving wireless communications of a wireless device.

FIG. 5 is a flow diagram of an exemplary process 500 for improving wireless communications of a wireless device. At step 502, a preferred roaming list containing information associated with communications carriers arranged in a predetermined order may be stored. A signal strength threshold value may be stored at step 504. At step 506, a determination that a signal strength of a first communications signal of a first communications carrier currently being received by a wireless device drops below the signal strength threshold value may be performed.

At step 508, a second communications carrier in the preferred roaming list positioned in a first direction from the position in the preferred roaming list of the first communications carrier having a second communications signal with a higher signal strength than the signal strength of the first communications signal may be selected. The second communications signal from the second communications carrier may be received at step 510. A time interval to receiving the second communications signal from the second communications carrier may be initiated at step 512. At step 514, a switch from receiving the second communications signal from the second communications carrier to receiving a third communications signal from a communications carrier positioned opposite the first direction on the preferred roaming list in response to completion of the time interval may be performed.

Figure 6:
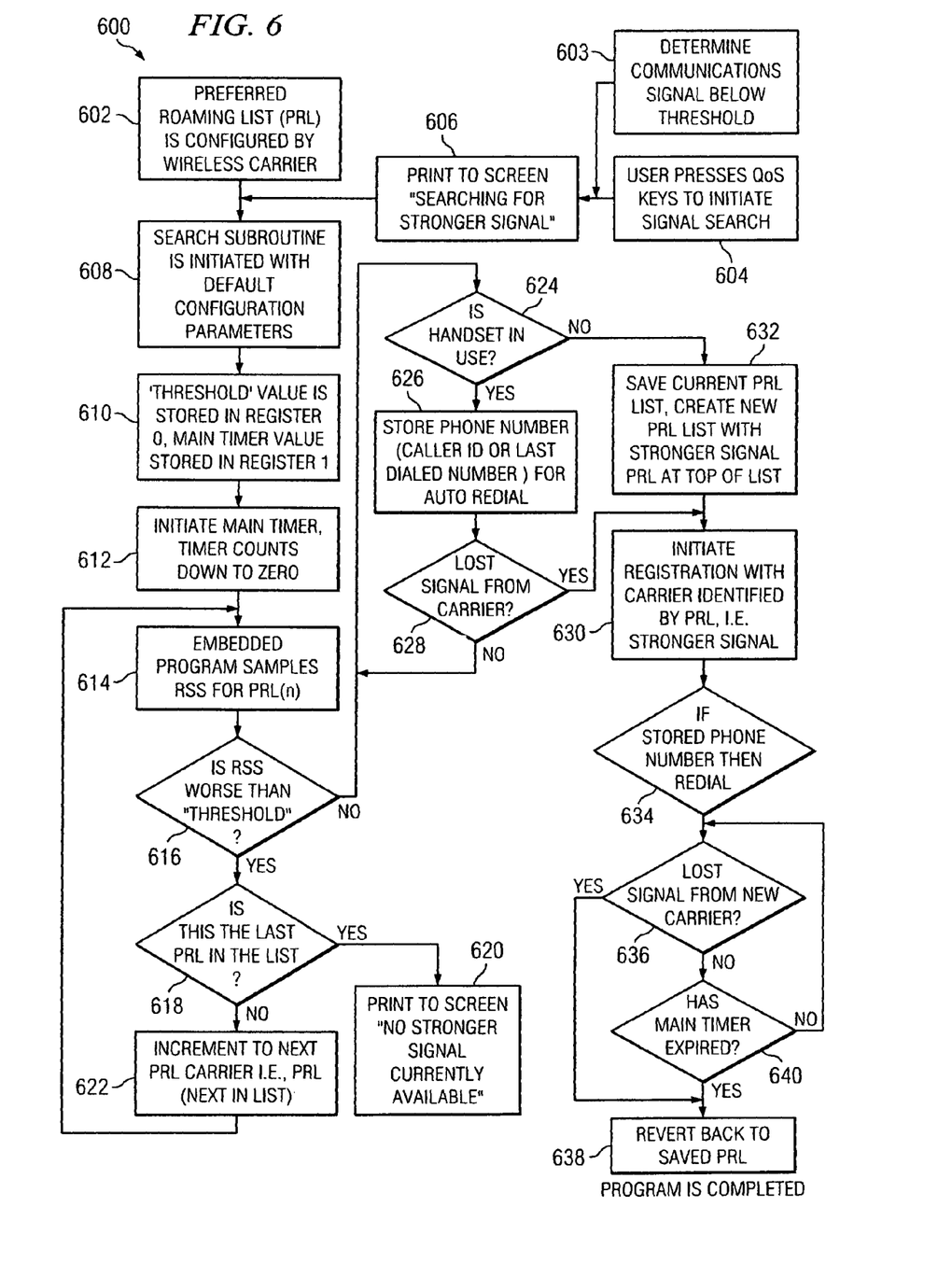
FIG. 6 is a detailed flow diagram of a first embodiment of an exemplary process for improving wireless communications of a wireless device.

FIG. 6 is a detailed flow diagram of a first embodiment of an exemplary process 600 for improving wireless communications of a wireless device. The process 600 starts at step 602, where a preferred roaming list is configured by a wireless communications carrier. At step 603, a determination may be made that a communications signal drops below a threshold value at which the communications signal is considered to be a marginal communications signal. Alternatively, at step 604, a user may press a QOS key or keys (e.g., *68*) to initiate a communications signal search. In response to the user manually initiating the signal search routine, a message may be displayed on a display to notify the user of a search for a stronger communications signal at step 606. It should be understood that a message may be displayed in response to a communications signal search being automatically or manual initiated.

At step 608, a communications signal search subroutine may be initiated with default configuration parameters, such as setting a threshold signal strength level, setting a pointer to the preferred roaming list, and setting a timer value. The search subroutine may be automatically or manually initiated. At step 610, a threshold signal strength level value may be stored in a first register and a main timer value may be stored in a first register and a threshold value may be stored in a second register. The main timer is a configuration parameter that specifies how often the program executes. The threshold value is a configuration parameter that is the minimum acceptable signal strength to provide quality wireless communications services. It should be understood that the threshold and timer values may be stored prior to the search subroutine being initiated. A main timer using the main timer value may be initiated at step 612. The main timer, in one embodiment, counts down to zero. Alternatively, the main timer may count up to the main timer value.

At step 614, an embedded program may sample received signal strength (RSS) of communications signals from a communications carrier as associated with position 'n' in the preferred roaming list (PRL). A determination may be made at step 616 as to whether the received signal strength is lower than the threshold signal strength level value. If so, then at step 618, a determination may be made to determine whether the communications carrier associated with the sampled communications signal is a last carrier identified in the preferred roaming list. If it is the last communications carrier identified in the preferred roaming list, then a message is displayed to notify the user that there is no stronger signal currently available at step 620. If it is determined that the communications carrier is not the last communications carrier identified in the preferred roaming list, then at step 622, a pointer may be incremented to a next communications carrier on the preferred roaming list. The process 600 returns to step 614.

If it is determined that the received signal strength is not worse than or below the communications signal threshold value at step 616, then at step 624, a determination is made as to whether the wireless device is in use (e.g., telephone call in progress). If so, then at step 626, a network address (e.g., telephone number) with which the wireless device is in communication is stored. The network address may be determined by caller ID or last dialed number by the wireless device. In one embodiment, the network address may be stored for auto redial. At step 628, a determination is made as to whether the communications signal is lost from the communications carrier. If not, then the process returns to step 624. Otherwise, the process continues at step 630, where registration with the communications carrier identified by the preferred roaming list is initiated as a result of determining that a communications signal provided by the communications carrier is stronger than the current communications carrier. If it is determined at step 624 that the handset is not in use, then the process 600 continues at step 632 where the current preferred roaming list is saved and a new preferred roaming list with the strongest signal communications carrier is positioned at the top of the list. The wireless device initiates registration with the communications carrier identified by the preferred roaming list at step 630.

At step 634, a determination is made to determine whether a network address was stored and is redialed, if so. A determination may be made at step 636 as to whether a communication signal of the new carrier is lost. If so, then at step 638, the wireless device reverts back to the previous communications carrier on the preferred roaming list. Alternatively, if the communications signal from the new communications carrier is determined not to be lost at step 636, then at step 640, a determination is made as to whether the main timer has expired. If so, then the wireless device reverts back to the previous communications carrier at step 638. Alternatively, the wireless device may perform a search to determine if a communications signal with a higher signal strength can be located from another communications carrier.

Figure 7:
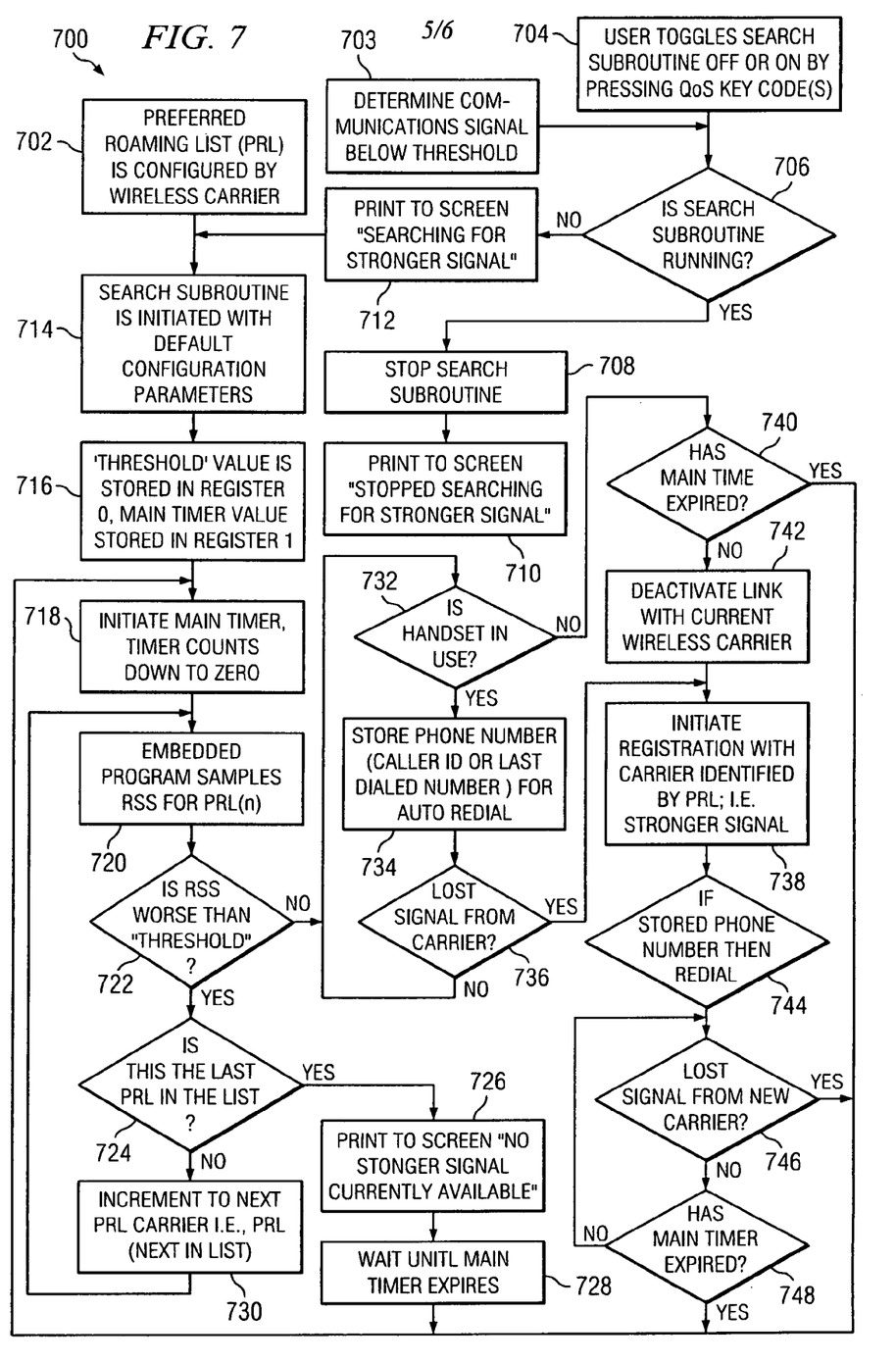
FIG. 7 is a detailed flow diagram of a second embodiment of an exemplary process for improving wireless communications of a wireless device.

FIG. 7 is a detailed flow diagram of a second embodiment of an exemplary process 700 for improving wireless communications of a wireless device. The process 700 starts at step 702, where a preferred roaming list is configured by a wireless carrier 702. At step 703, a determination may be made that a communications signal drops below a threshold value at which the communications signal is considered to be a marginal communications signal. Alternatively, at step 704, a user may press a quality of service key or keys to initiate a communications signal search. At step 706, a determination may be made as to whether a communications signal search subroutine is running. If so, then at step 708, the communications signal search subroutine is stopped and a message may be displayed on the wireless device that the wireless device stopped searching for a stronger signal at step 710. If a communications signal search subroutine is not determined to be running at step 706, then at step 712, a message may be displayed on the wireless device that the wireless device is searching for a stronger communications signal.

At step 714, a communications signal search subroutine may be initiated with default configuration parameters, such as setting a threshold signal strength level, setting a pointer to the preferred roaming list, and setting a timer value. The search subroutine may be automatically or manually initiated. At step 716, a threshold signal strength level value may be stored in a first register and a main timer value may be stored in a first register and a threshold value may be stored in a second register. It should be understood that the threshold and timer values may be stored prior to the search subroutine being initiated. A main timer using the main timer value may be initiated at step 718. The main timer, in one embodiment, counts down to zero. Alternatively, the main timer may count up to the main timer value.

At step 720, an embedded program may sample received signal strength of communications signals from a communications carrier as associated with position 'n' in the preferred roaming list (PRL). A determination may be made at step 722 as to whether the received signal strength is lower than the threshold signal strength level value. If so, then at step 724, a determination may be made to determine whether the communications carrier associated with the sampled communications signal is a last carrier identified in the preferred roaming list. If it is the last communications carrier identified in the preferred roaming list, then a message is displayed to notify the user that there is no stronger signal currently available at step 726. At step 728, the wireless device may wait until the main timer expires and then return to step 718 for re-initialization of the main timer. If it is determined that the communications carrier is not the last communications carrier identified in the preferred roaming list, then at step 730, a pointer may be incremented to a next communications carrier on the preferred roaming list. The process 700 returns to step 720.

If it is determined that the received signal strength is not worse than or below the communications signal threshold value at step 722, then at step 732, a determination is made as to whether the wireless device is in use. If so, then at step 734, a network address with which the wireless device is in communication is stored. The network address may be determined by caller ID or last dialed number by the wireless device. In one embodiment, the network address may be stored for auto redial. At step 736, a determination is made as to whether the communications signal is lost from the communications carrier. If not, then the process returns to step 732. Otherwise, the process continues at step 738, where registration with the communications carrier identified by the preferred roaming list is initiated as a result of determining that a communications signal provided by the communications carrier is stronger than the current communications carrier. If it is determined at step 732 that the handset is not in use, then at step 740, a determination is made to determine if the main timer has expired. If so, then the process returns to step 718 to initiate the main timer again. Otherwise, the process continues at step 742 to deactivate a communications link with the current wireless communications carrier. The wireless device initiates registration with the communications carrier identified by the preferred roaming list at step 738.

At step 744, a determination is made to determine whether a network address was stored and is redialed, if so. A determination may be made at step 746 as to whether a communication signal of the new carrier is lost. If so, then the process returns to step 718 to re-initiate the main timer. Alternatively, if the communications signal from the new communications carrier is determined not to be lost at step 746, then at step 748, a determination is made as to whether the main timer has expired. If so, then the process 700 returns back to step 718 to re-initiate the main timer. Alternatively, the process 700 loops back to step 746 until either a determination is made that the communications signal of the new communications carrier is lost or the main timer has expired at step 748.

Figure 8:
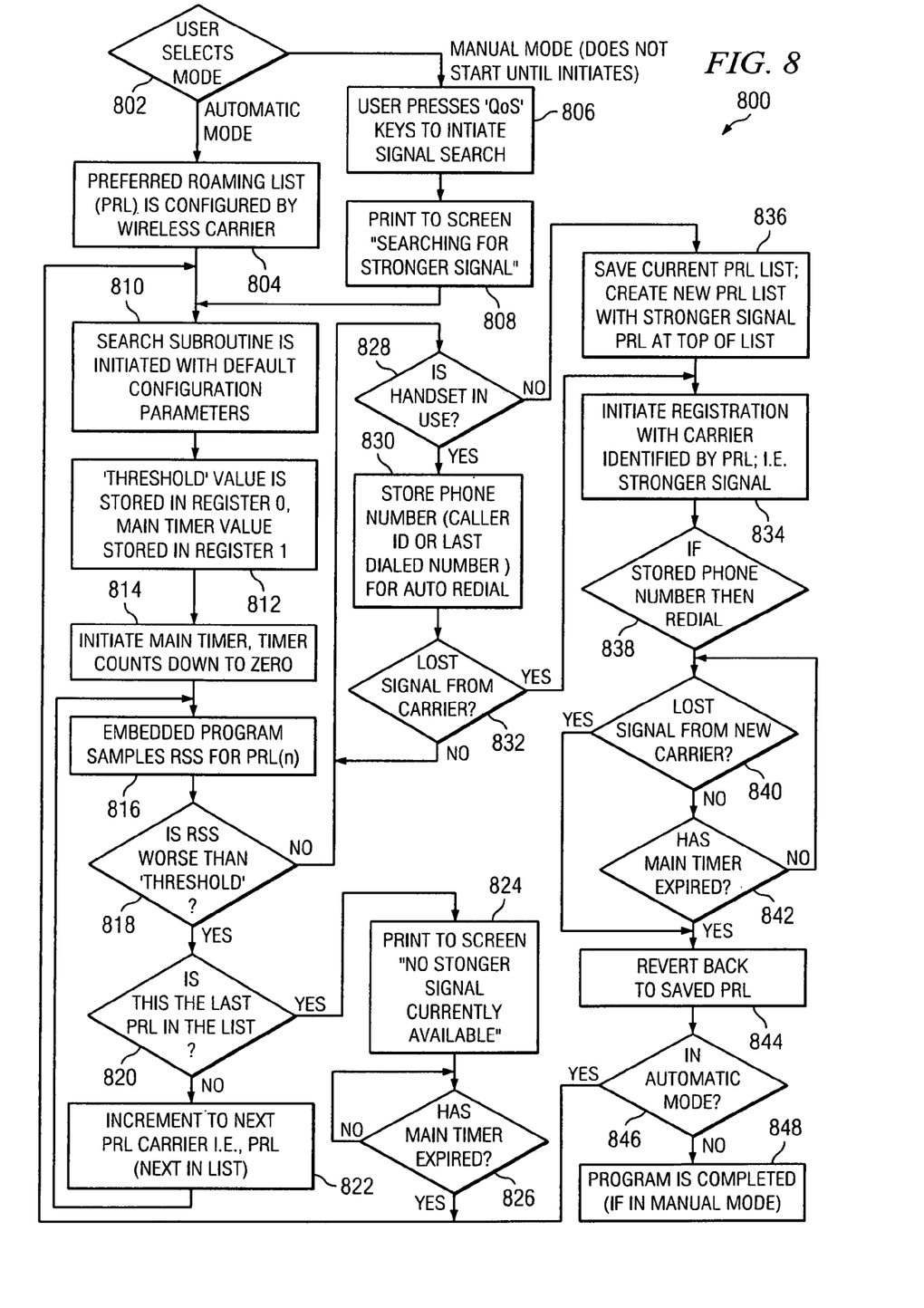
FIG. 8 is another detailed flow diagram of a third embodiment of an exemplary process for improving wireless communications of a wireless device.

FIG. 8 is another detailed flow diagram of a third embodiment of an exemplary process 800 for improving wireless communications of a wireless device. The process 800 starts at step 802, where a user of the wireless device selects a preferred roaming mode of a wireless device to be automatic or manual. If the user selects for the mode to be automatic, then the process continues at step 804, where a preferred roaming list is configured by a wireless communications carrier. If the user selects for the mode to be manual, then the process continues at step 806, where the user may press a 'QoS' key or keys to initiate a signal search. In response to the user manually initiating the signal search routine, a message may be displayed on a display to notify the user of a search for a stronger communications signal at step 808. It should be understood that a message may be displayed in response to a communications signal search being automatically or manual initiated.

At step 810, a communications signal search subroutine may be initiated with default configuration parameters, such as setting a threshold signal strength level, setting a pointer to the preferred roaming list, and setting a timer value. At step 812, a threshold signal strength level value may be stored in a first register and a main timer value may be stored in a first register and a threshold value may be stored in a second register. The main timer is a configuration parameter that specifies how often the program executes. The threshold value is a configuration parameter that is the minimum acceptable signal strength to provide quality wireless communications services. It should be understood that the threshold and timer values may be stored prior to the search subroutine being initiated. A main timer using the main timer value may be initiated at step 814. The main timer, in one embodiment, counts down to zero. Alternatively, the main timer may count up to the main timer value.

At step 816, an embedded program may sample received signal strength (RSS) of communications signals from a communications carrier as associated with position 'n' in the preferred roaming list (PRL). A determination may be made at step 818 as to whether the received signal strength is lower or "worse" than the threshold signal strength level value. If so, then at step 820, a determination may be made to determine whether the communications carrier associated with the sampled communications signal is a last carrier identified in the preferred roaming list. If it is determined that the communications carrier is not the last communications carrier identified in the preferred roaming list, then at step 822, a pointer may be incremented to a next communications carrier on the preferred roaming list. The process 800 returns to step 816. If the carrier is the last communications carrier identified in the preferred roaming list, then a message is displayed at step 824 to notify the user that there is no stronger signal currently available. A determination is made at step 826 to determine if the main timer has expired. If not, then the process continues to loop at step 826 to wait until the main timer expires. When the main timer expires, then the process continues at step 810.

If it is determined at step 818 that the received signal strength is not worse than or below the communications signal threshold value, then at step 828, a determination is made as to whether the wireless device is in use (e.g., telephone call in progress). If so, then at step 830, a network address (e.g., telephone number) with which the wireless device is in communication is stored. The network address may be determined by caller ID or last dialed number by the wireless device. In one embodiment, the network address may be stored for auto redial. At step 832, a determination is made as to whether the communications signal is lost from the communications carrier. If not, then the process returns to step 828. Otherwise, the process continues at step 834, where registration with the communications carrier identified by the preferred roaming list is initiated as a result of determining that a communications signal provided by the communications carrier is stronger than the current communications carrier. If it is determined at step 828 that the handset is not in use, then the process 800 continues at step 836, where the current preferred roaming list is saved and a new preferred roaming list with the strongest signal communications carrier is positioned at the top of the list. The wireless device initiates registration with the communications carrier identified by the preferred roaming list at step 834.

At step 838, a determination is made to determine whether a network address was stored and is redialed, if so. A determination may be made at step 840 as to whether a communication signal of the new carrier is lost. If the communications signal from the new communications carrier is determined not to be lost at step 840, then at step 842, a determination is made as to whether the main timer has expired. If not, then the process loops back to step 840. Alternatively, if the main timer has expired, then the process 800 continues at step 844, where the wireless device reverts back to the previous communications carrier at step 844. If at step 840 the signal from the new carrier is determined to be lost, then the process 800, too, reverts back to the previous communications carrier at step 844. A determination is made at step 846 to determine if the wireless device is configured in automatic mode. If so, then the process 800 continues at step 810. If in manual mode, then process is complete.

Although particular embodiments of the present invention have been explained in detail it should be understood that various changes, substitutions, and alterations can be made to such embodiments without departing from the spirit and scope of the present invention as defined solely by the following claims.

We claim:

1. A wireless device, comprising:
   a transceiver configured to transmit and receive communications signals;
   a processor in communication with said transceiver;
   a memory in communication with said processor and configured to store a preferred roaming list containing information associated with communications carriers arranged in a predetermined order and a signal strength threshold value indicative of a communications signal being a marginal communications signal by the communications signal being received by said transceiver having a signal strength value below the signal strength threshold value, the marginal communications signal being defined by a quality of service level degrading beyond a threshold level; and
   a plurality of software modules executed by said processor, including:
      a signal strength measurement module configured to measure signal strength of a communications signal received by said transceiver; and
      a signal search module configured to:
         in response to a manual user request, determine whether the signal strength of a first communications signal of a first communications carrier currently being received by said transceiver is a marginal communications signal;
         in response to determining that the first communications signal is a marginal communications signal, select a second communications carrier in the preferred roaming list positioned in a first direction from the position in the preferred roaming list of the first communications carrier having a second communications signal with a higher signal strength than the signal strength of the first communications signal; and
         in further response to determining that the first communications signal is a marginal communications signal, switch said transceiver from receiving the first communications signal to receive the second communications signal from the second communications carrier in response to determining that the first communications signal is a marginal communications signal.

2. The wireless device according to claim 1, further comprising a timer module configured to define a time interval that specifies how often a signal search module executes, and wherein said signal search module is further configured to:
   cause said timer module to initiate a time interval between which said transceiver receives the second communications signal from the second communications carrier; and
   switch said transceiver from receiving the second communications signal from the second communications carrier to receiving the first communications signal from the first communications in response to completion of the time interval.

3. The wireless device according to claim 2, wherein said signal search module is further configured to store information associated with the first communications carrier to enable switching from receiving the second communications signal back to the first communications carrier in response to completion of the time interval.

4. The wireless device according to claim 1, wherein said processor is configured to download and execute said signal search module.

5. The wireless device according to claim 1, further comprising a registration module for registering the wireless device with the different communications carriers.

6. The wireless device according to claim 1, wherein the wireless device is a mobile handset.

7. The wireless device according to claim 1, wherein said signal search module is further configured to automatically cause said transceiver to receive the second communications signal from the second communications carrier.

8. The wireless device according to claim 1, wherein said software modules further includes a quality of service user activation module configured to determine that a user manually enters a quality of service request and notifies said signal search module to determine if another communications carrier has higher signal strength.

9. The wireless device according to claim 1, wherein said signal search module is further configured to operate while said processor is not handling a communication session by a user.

10. The wireless device according to claim 1, wherein said signal search modules is further configured to notify a user of the wireless device that a higher signal strength of a communications signal from a different communications carrier is available.

11. The wireless device according to claim 10, wherein said software modules further include an automatic callback module to reconnect to a network address automatically in response to (i) a disconnection by the user in response to a notification that a communications signal having higher signal strength is available or (ii) a drop call occurs.

12. A method for improving wireless communications for a user of a wireless device, said method comprising:
   storing a preferred roaming list containing information associated with communications carriers arranged in a predetermined order;
   storing a signal strength threshold value indicative of a communications signal being a marginal communications signal by a communications signal being received having a signal strength value below the signal strength threshold value;
   in response to a manual user request, determine whether signal strength of a first communications signal of a first communications carrier currently being received by a wireless device is a marginal communications signal;
   in response to determining that the first communications signal is a marginal communications signal, selecting a second communications carrier in the preferred roaming list positioned in a first direction from the position in the preferred roaming list of the first communications carrier having a second communications signal with a higher signal strength than the signal strength of the first communications signal; and
   in further response to determining that the first communications signal is a marginal communications signal, switching from receiving the first communications signal to receiving the second communications signal from the second communications carrier in response to determining that the first communications signal is a marginal communications signal.

13. The method according to claim 12, further comprising:
   initiating a time interval over which to receive the second communications signal from the second communications carrier; and
   switching from receiving the second communications signal from the second communications carrier to receiving the first communications signal from the first communications carrier in response to completion of the time interval.

14. The method according to claim 13, further comprising:
   storing information associated with the first communications carrier; and
   looking up the stored information associated with the first communications carrier in response to completion of the time interval; and
   switching from receiving the second communications signal back to the first communications carrier by using the looked-up stored information associated with the first communications carrier.

15. The method according to claim 12, further comprising downloading and executing a software module to perform communications signal searching to locate a higher communications signal associated with a communications carrier listed on the preferred roaming list.

16. The method according to claim 12, further comprising registering the wireless device with a different communications carrier prior in establishing communications with the communications carrier.

17. The method according to claim 12, wherein storing the preferred roaming list is performed in a mobile handset.

18. The method according to claim 12, further comprising:
   determining that a quality of service request has been manually activated; and
   determining if another communications carrier has a higher signal strength in response to determining that a quality of service request has been manually activated.

19. The method according to claim 12, wherein determining, selecting, receiving, initiating, and switching are performed while not performing user communications.

20. The method according to claim 12, further comprising notifying a user of the wireless device that a higher signal strength of a communications signal from a different communications carrier is available.

21. The method according to claim 20, wherein further comprising:
   determining that a user disconnects from the first communications signal in response to a notification of a higher signal strength of a communications signal from a different communications carrier or that a drop call occurred; and
   performing an automatic callback to reconnect to a network address in response to determining that the user disconnected from the first communications signal or that a drop call occurred.

\* \* \* \* \*